May 31, 1932.　　　M. L. HANCOCK　　　1,860,414
DUPLEX CONTROL OF RESERVOIR PRESSURE
Filed Oct. 16, 1930
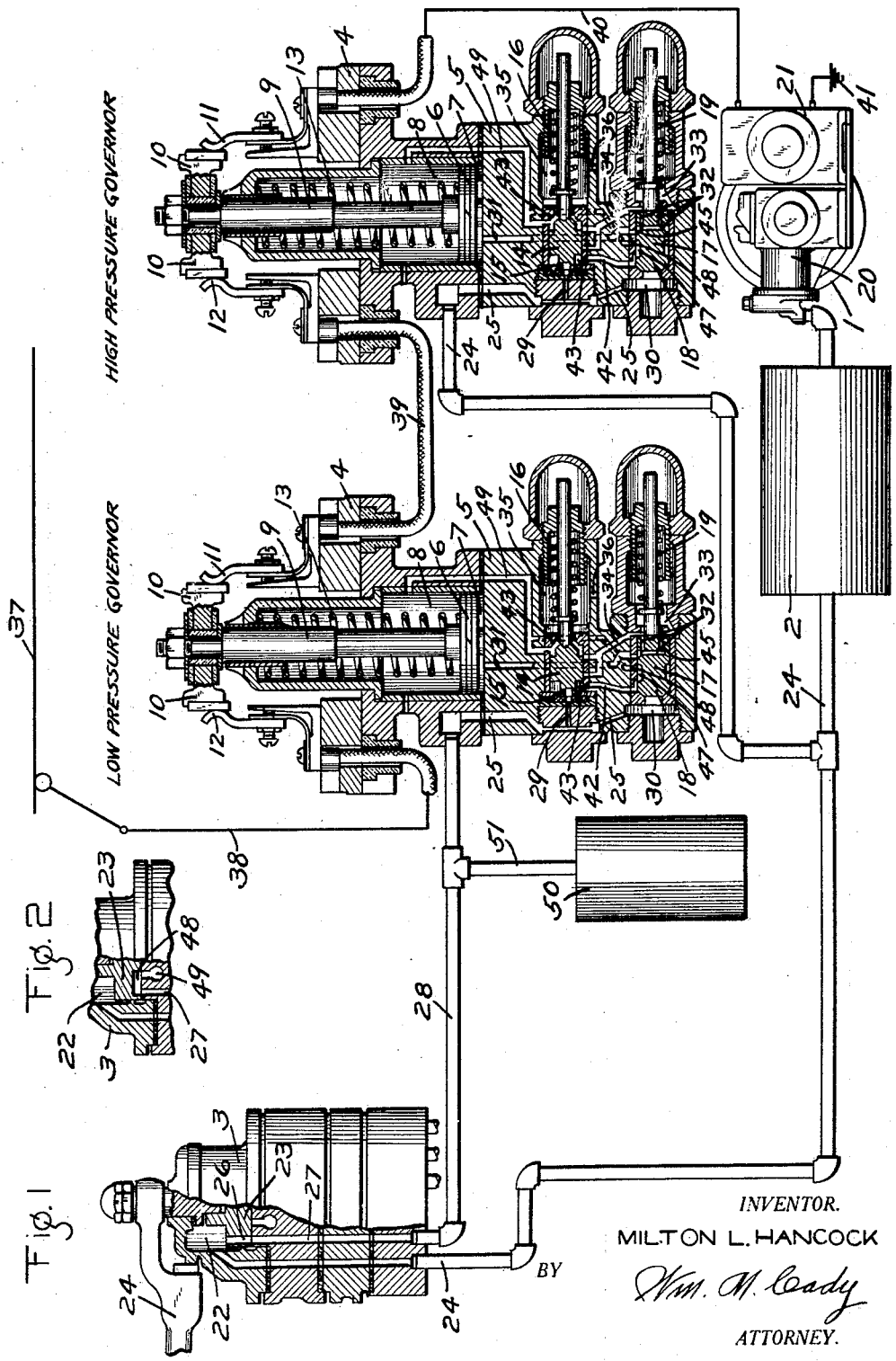
INVENTOR.
MILTON L. HANCOCK
BY Wm. M. Cady
ATTORNEY.

Patented May 31, 1932

1,860,414

UNITED STATES PATENT OFFICE

MILTON L. HANCOCK, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

DUPLEX CONTROL OF RESERVOIR PRESSURE

Application filed October 16, 1930. Serial No. 489,011.

This invention relates to pressure governors of the type particularly adapted to control the operation of an electrically actuated fluid compressor in such a manner as to automatically maintain the pressure of fluid in a reservoir at a predetermined, substantially constant value.

Under certain conditions of train operation, such as when the train brakes are released and the brake equipments are charged with fluid under pressure, it is only necessary to carry a relatively low pressure in the main reservoir for the purpose of maintaining the brake system charged against leakage, but in releasing after an application of the brakes, it is desirable to have a relatively high pressure available in the main reservoir for quickly recharging the brake system.

The principal object of my invention is to provide improved means for so controlling the operation of a fluid compressor as to maintain a certain predetermined pressure in a reservoir at one time, and for maintaining a different predetermined pressure in the reservoir at another time.

In carrying out my invention, I employ a high pressure governor and a low pressure governor for at different times controlling the operation of a fluid compressor. Both governors are of a well known type employed for controlling the circuit through an electric motor and operate upon a predetermined increase in reservoir pressure to stop the operation of the compressor and upon a predetermined decrease in reservoir pressure to start the compressor operating, and in this manner cause the compressor to maintain the reservoir pressure between fixed limits or at a predetermined substantially constant pressure, as hereinbefore mentioned.

In the accompanying drawings; Figure 1 is a diagrammatic view, partly in section, of a portion of a fluid pressure control system embodying my invention; and Fig. 2 is a diagrammatic view of a portion of the brake valve device shown in Fig. 1, but having the rotary valve in a different position.

As shown in the drawings, the fluid pressure control system comprises a low pressure governor, a high pressure governor, an electrically operated fluid compressor 1, a reservoir 2, and a brake valve device 3.

The low pressure governor and high pressure governor are each of the same construction and each comprises a switch portion 4 and a regulating portion 5. The switch portion 4 comprises a piston 6 having at one side a chamber 7 and at the other side a chamber 8 and provided with a stem 9, carrying at its outer end connected switch contacts 10 adapted to bridge two fixed contacts 11 and 12 for closing an electric circuit. A spring 13 is contained in the chamber 8 for urging the piston 6 to the cut-in position as shown in the drawings.

The regulating portion 5 of the governors comprises a cut-in piston 14 having at one end a valve 15 and subject to the pressure of an adjustable coil spring 16, and a cut-out piston 17 having at one end a valve 18 and subject to the pressure of an adjustable coil spring 19.

The electrically operated fluid compressor 1 may be of any well known construction comprising a compressor portion 20 for supplying fluid under pressure to the reservoir 2 and an electric motor 21 for operating the compressor.

The brake valve device 3 is of the usual construction comprising a casing having a chamber 22 containing a rotary valve 23 adapted to be turned to various positions by means of a handle 24.

In operation, it is assumed that the adjustable springs 16 and 19 of the governors are adjusted to the desired, predetermined cutting-in and cutting-out pressures. For example, the cut-in valve spring 16 of the low pressure governor is so adjusted as to seat the cut-in valve 15 against an opposing reservoir pressure of 115 pounds acting on the cut-in piston 14, and the cut-out valve spring 19 is so adjusted as to maintain the cut-out valve 18 seated until the reservoir pressure is increased to 125 pounds. In the high pressure governor, the adjustment of the cut-in valve spring may be 130 pounds, and of the cut-out valve spring 140 pounds. It will be noted that the adjustment of the cut-in valve spring and cut-out valve spring of the two governors is so arranged that the cut-out pressure of the low pressure governor is lower than the cut-in pressure of the high pressure governor, so that there will be no overlapping of the operating pressures of the governors, which would interfere in the desired operation.

Fluid under pressure from the reservoir 2 flows through pipe 24 to passage 25 in the high pressure governor and to valve chamber 22 in the brake valve device 3. With the brake valve device in the running position shown in Fig. 1 of the drawings, fluid at reservoir pressure flows from valve chamber 22 through port 26 in the rotary valve 23 to passage 27, which is connected through pipe 28 with passage 25 in the low pressure governor.

Fluid under pressure supplied to passage 25 in the low pressure governor and in the high pressure governor flows therefrom through a passage 29 to the seated area of the cut-in valve 15 and from passage 25 through chamber 30 to the seated area of the cut-out valve 18.

Assuming the reservoir pressure to be less than the adjusted cutting-in pressure of the cut-in valve spring 16 of the low pressure governor, the cut-in valve 15 and cut-out valve 18 of both governors will be seated and the piston chamber 7 of each governor will be connected to the atmosphere through passage 31, groove 45, and ports 32 in the cut-out piston 17, chamber 33, passage 34, past the end of the cut-in piston 14, chamber 35 and atmospheric port 36. With the piston chamber 7 at atmospheric pressure, the pressure of spring 9 in each governor holds the piston 6 in the position shown in the drawings in which the contacts 10 engage the fixed contacts 11 and 12 which closes a circuit from a source of current, such as a trolley wire 37, through the compressor motor 21 by way of wire 38, contacts 12, 10 and 11 of the low pressure governor, wire 39, contacts 12, 10 and 11 of the high pressure governor, wire 40 to the compressor motor and ground 41.

With the circuit closed through the electric motor 21, the compressor 20 is operated to supply fluid under pressure to the reservoir 2, which increases the pressure of fluid acting on the cut-in valve 15 and cut-out valve 18 of the high pressure governor and of the low pressure governor, the brake valve device 3 being in running position, as shown in the drawings, in which communication is established to the low pressure governor.

In both governors the seated area of the cut-out valve 18 is greater than the seated area of the cut-in valve 15. The cut-out valve spring 19 of the high pressure governor is of greater value than the corresponding spring in the low pressure governor, so that when the reservoir pressure acting on the seated area of the cut-out valve 18 of the low pressure governor is built up sufficient to overcome the pressure of spring 19, the cut-out valve is moved away from its seat. This permits fluid at reservoir pressure to flow through passage 42 to chamber 43 and therein supplement the reservoir pressure acting on the valve 15 and shift the cut-in piston 14 to its seat 43. With the cut-in piston 14 of the low pressure governor engaging seat 43, fluid at reservoir pressure flows from passage 25, through passage 29, chamber 43 and passage 34 to the cut-out piston chamber 33, thereby balancing the pressure of fluid acting on the opposite ends of cut-out piston 17, which permits spring 19 to shift said piston back to its normal position and thus seat valve 18.

When the cut-out piston 17 is moved back to its normal position, the annular groove 45 in the cut-out piston registers with the passage 31 and fluid under pressure is permitted to flow from chamber 33 through the ports 32, groove 45, and passage 31 to switch piston chamber 7. The pressure of fluid in chamber 7 shifts the piston 6 upwardly, compressing spring 13 and moving the contacts 10 out of engagement with the contacts 11 and 12. The circuit through the compressor motor is thereby opened, which causes the compressor 20 to stop.

When the pressure of fluid in reservoir 2 and acting on the full exposed area of cut-in piston 14 is reduced sufficient to be overcome by the pressure of the spring 16, the cut-in piston 14 is moved away from its seat 43, which permits fluid under pressure to flow to the cut-in piston spring chamber 35 by way of passage 42, annular groove 47 in the cut-out piston 17, passage 48 and passage 49. The rate of flow to the cut-in piston spring chamber 35 exceeds the venting capacity of the atmospheric port 36, thereby causing a pressure to be built up on piston 14 which aids spring 16 in moving the piston 14 so as to seat the valve 15. Fluid under pressure is then vented from the piston chamber 7 through passage 31, annular groove 45 in the cut-out piston 17, ports 32, chamber 33, passage 34, chamber 35, and atmospheric port 36, which permits spring 13 to shift the piston 6 downwardly and move contacts 10 into engagement with contacts 11 and 12. The circuit through the compressor motor is thus closed and the compressor is then operated to build up the pressure in the reservoir 2.

It will be noted the high pressure governor does not operate when the low pressure governor is controlling because the high pressure governor is adjusted for higher pressures than the low pressure governor permits to be obtained.

If it is desired to have a higher pressure in the reservoir 2 than permitted by the control of the low pressure governor, the brake valve device 3 is turned to another position, such as service or lap position, as shown in Fig. 2 of the drawings, in which position the fluid pressure supply pipe 28 to the low pressure governor is connected to the atmosphere through passage 27, cavity 48 in the rotary valve 23 and atmospheric passage 49. By thus connecting the low pressure governor to the atmosphere, it is rendered inoperative, and will remain in the cut-in position irrespective of the pressure of fluid obtained in the reservoir 2.

With the low pressure governor thus rendered inoperative, and the high pressure governor connected directly to the reservoir 2, the high pressure governor will operate to control the pressure in said reservoir in the same maner as the low pressure governor, but since the contol springs 19 and 16 in the high pressure governor are of a higher adjusted value than the corresponding springs in the low pressure governor, the reservoir pressure required to operate the high pressure governor to cut-out position will be higher than required to operate the low pressure governor to cut-out position and the pressure at which the high pressure governor will operate to cut-in position will also be higher.

It will be noted that the compressor circuit is at all times controlled through the switch contacts of both governors, but that the regulating portions 5 operate independently of each other in accordance with the position of the brake valve device 3.

A reservoir 50 is connected by a branch pipe 51 to the low pressure governor supply pipe 28 for the purpose of increasing the volume of fluid under pressure acting on the low pressure governor cut-in valve 15 and cut-out valve 18, so as to stabilize the pressure acting on said valves against possible fluctuations in the pressure of fluid in the rotary valve chamber 22 of the brake valve device. This is not necessary in the case of the high pressure governor since the reservoir 2 is directly connected thereto.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a reservoir, a compressor for supplying fluid under pressure to said reservoir, and a motor for operating said compressor, of two switches arranged in series in the circuit of said motor for controlling said circuit, a pair of governors, each operative by the pressure of fluid in said reservoir for controlling one of said switches and means for cutting one governor into action when the other governor is cut out of action.

2. The combination with a reservoir, a compressor for supplying fluid under pressure to said reservoir, and a motor for operating said compressor, of a pair of switches connected in series and independently operative to control the circuit of said motor, a governor for each of said switches controlled by the pressure of fluid in said reservoir, and means for selecting the governor and switch for controlling the motor circuit.

3. The combination with a reservoir, a compressor for supplying fluid under pressure to said reservoir, and a motor for operating said compressor, of two switches arranged in series in the circuit of said motor, a governor for each of said switches operative by the pressure of fluid in said reservoir for controlling the operation of said switches, and means for cutting off the supply of fluid to one of said governors for rendering it inoperative.

4. The combination with a reservoir, a compressor for supplying fluid under pressure to said reservoir, and a motor for operating said compressor, of a pair of governors each subject to the pressure of fluid in said reservoir for controlling the electric circuit of said motor, and valve means for controlling the supply of fluid from said reservoir to one of said governors and having a position for cutting off said supply for rendering the last mentioned governor inoperative to control said circuit.

5. The combination with a reservoir, a compressor for supplying fluid under pressure to said reservoir, and a motor for operating said compressor, of a high pressure governor subject to the pressure of fluid in said reservoir for controlling the circuit of said motor, a low pressure governor cooperative with said high pressure governor for closing said circuit and operative by fluid under pressure supplied from said reservoir to open said circuit, and valve means for cutting off the supply of fluid under pressure to said low pressure governor for rendering said low pressure governor inoperative to open said circuit.

6. The combination with a reservoir, a compressor for supplying fluid under pressure to said reservoir, and an electric motor for operating said compressor, of a high pressure governor and a low pressure governor cooperative with each other at one time for closing the circuit of said motor, and operative independently of each other at another time in accordance with the pressure of fluid in said reservoir for opening said circuit, and valve means for controlling communication from said low pressure governor to said reservoir and having a position for closing said communication and opening an atmospheric connection to said low pressure governor for rendering said low pressure governor inoperative to open said circuit.

7. The combination with a reservoir, a compressor for supplying fluid under pressure to said reservoir, and an electric motor for operating said compressor, of a high pressure governor and a low pressure governor cooperative with each other at one time for closing the circuit of said motor, and operative independently of each other at another time in accordance with the pressure of fluid in said reservoir for opening said circuit, and valve means for controlling communication from said low pressure governor to said reservoir and having a position for closing said communication and permitting said low pressure governor to be subject to the pressure of the atmosphere for rendering said low pressure governor inoperative to open said circuit.

8. The combination with a reservoir, a compressor for supplying fluid under pressure to said reservoir, and an electric motor for operating said compressor, of a high pressure governor having a switch for opening and closing the cricuit of said motor, and a valve mechanism subject to the pressure of fluid in said reservoir for operating said switch to open the motor circuit upon a predetermined increase in reservoir pressure and to close the motor circuit upon a predetermined decrease in reservoir pressure, a low pressure governor having a switch for opening and closing said motor circuit, and a valve mechanism subject at one time to the pressure of fluid in said reservoir for operating the low pressure governor switch to open the motor circuit upon an increase in reservoir pressure to a degree less than that at which the high pressure governor operates to close the motor circuit, and operative upon a decrease in reservoir pressure to close the motor circuit, said low pressure governor valve mechanism being subject at another time to atmospheric pressure for rendering it inoperative to open the motor circuit, and valve means for controlling communication from said low pressure governor to said reservoir and to the atmosphere.

In testimony whereof I have hereunto set my hand, this 13th day of October, 1930.

MILTON L. HANCOCK.